(12) United States Patent
Graf et al.

(10) Patent No.: US 8,994,987 B2
(45) Date of Patent: Mar. 31, 2015

(54) ACHIEVEMENT-BASED COMPENSATION FOR A PRINT SERVICE PROVIDER

(75) Inventors: Charles T. Graf, Lizton, IN (US); Patrick E. Miner, Indianapolis, IN (US)

(73) Assignee: Xerox Corporation, Norwalk, CT (US)

( * ) Notice: Subject to any disclaimer, the term of this patent is extended or adjusted under 35 U.S.C. 154(b) by 544 days.

(21) Appl. No.: 13/072,397

(22) Filed: Mar. 25, 2011

(65) Prior Publication Data

US 2012/0243030 A1 Sep. 27, 2012

(51) Int. Cl.
G06F 3/12 (2006.01)
G06Q 10/06 (2012.01)

(52) U.S. Cl.
CPC .................................. G06Q 10/06 (2013.01)
USPC ........... 358/1.15; 705/7.21; 705/20; 705/408; 705/415

(58) Field of Classification Search
CPC .......... H04N 1/32427; H04N 21/2542; H04N 21/2543; H04N 21/4784
USPC ................................................. 358/1.1–3.29
See application file for complete search history.

(56) References Cited

U.S. PATENT DOCUMENTS

| | | | |
|---|---|---|---|
| 8,060,394 B2* | 11/2011 | Woodings et al. | 705/7.13 |
| 2003/0018525 A1* | 1/2003 | Joao | 705/14 |
| 2004/0190014 A1* | 9/2004 | Ferlitsch | 358/1.5 |
| 2006/0197977 A1* | 9/2006 | Miyata | 358/1.15 |
| 2008/0180729 A1* | 7/2008 | LaVigne et al. | 358/1.15 |
| 2008/0239366 A1* | 10/2008 | Cyman et al. | 358/1.15 |
| 2009/0012835 A1* | 1/2009 | Gorczyca et al. | 705/9 |
| 2011/0313820 A1* | 12/2011 | Biewald et al. | 705/7.42 |

* cited by examiner

*Primary Examiner* — Marcellus Augustin
(74) *Attorney, Agent, or Firm* — Fox Rothschild LLP

(57) ABSTRACT

A method and system for tracking and calculating achievement-based compensation for a print service provider. The method includes determining one or more print services associated with a print job to be completed, receiving information indicating at least one of the one or more print services has been completed by a worker, updating a job ticket associated with the job to be completed to indicate that at least one of the one or more print services has been completed, and determining a compensation level for the worker based upon a rate of compensation associated with the one or more completed print services. The system includes various computer system for implementing the method.

15 Claims, 7 Drawing Sheets

| ACTIVITY BASED TRACKING: OPEN TASKS: | | | | | |
|---|---|---|---|---|---|
| MONITOR NAME: FINISHING | | | | | |
| LAST REFRESH: 9/16/2010 2:42:25PM | | | | | |
| ASSOCIATE | TICKET # | TASK | TASK NUMBER | JOB LOCATION | REDO STATUS |
| JOHNSON, TOM | 219 | LABEL APPLICATION - ADDRESS | ‖‖‖ 3130 | SHIPPING SERVICE | |
| THOMAS, JOHN | 241 | SCORE | ‖‖‖ 3132 | FINISHING SERVICE | |

302

| JOB LOCATION | | | | | |
|---|---|---|---|---|---|
| PRINT PRODUCTION | SHIPPING SERVICES | OUTSOURCED LOCATION | MAIL SHELF | | |
| FINISHING SERVICES | CUSTOMER SERVICE CENTER | TICKET TRANSFER | AWAITING DELIVERY | | |
| QUALITY CONTROL | SUPERVISORS OFFICE | | PENDING POST | | |

304

ACHIEVEMENT-BASED COMPENSATION FOR A PRINT SERVICE PROVIDER

BACKGROUND

The present disclosure relates to an information management system for job progress tracking. More specifically, the present disclosure relates to an achievement-based compensation model for print job progress tracking.

Performance based compensation, also known as achievement-based compensation (ABC) is commonly used is various fields. In manufacturing, workers on a production assembly or production line may be compensated for each component manufactured. For example, a certain production line may be configured to produce automobiles. For every automobile manufactured, each worker on the production line may receive a particular level of ABC. If the production line is expected to produce 100 automobiles every shift, workers on a certain shift (e.g., an eight hour shift of production line workers) may be penalized or rewarded accordingly based upon the total number of automobiles manufactured during that shift. For example, if a shift produces 105 automobiles, each worker on the production line during that shift may receive a compensation bonus. Conversely, if the shift only produces 98 automobiles, workers for the shift may receive a decreased compensation.

However, during assembly of an automobile, numerous tasks must be completed by each worker on the production line. A delay in any of the individual tasks may result in a delay to the overall manufacturing efficiency of the production line, and therefore impact each worker on the production line whether they are responsible for the delay or not.

Another industry that utilizes an ABC model is the print service industry. A certain print shop may bill as customer based upon the number of print jobs completed for the customer. Each worker involved in the completion of the print job may be compensated accordingly. As described above, if the print service is operating in a highly efficient manner, each worker may receive a bonus. Conversely, if the print service is experiencing delays or low quality work product, each worker may receive a cut in compensation.

Like manufacturing an automobile, producing a print job may require several tasks to be completed. For example, to produce a pamphlet, individual pages are printed and put into proper order, a cover is produced, a specific binding such as a spiral binding can be used requiring each page be aligned and punched, and the binding is installed. A quality review may then be performed. A delay in an individual task results in a delay to the entire print job, and each worker associated with the print job may be unfairly compensated as a result of the delays.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a method for tracking and calculating achievement-based compensation for a print service provider. The method includes determining, by a processing device, one or more tasks associated with a print job to be completed, the one or more tasks including printing services to be completed; receiving, by the processing device, information indicating at least one of the one or more tasks has been completed by a worker; updating, by the processing device, a job ticket associated with the job to be completed to indicate that at least one of the one or more tasks has been completed; and determining, by the processing device, a compensation level for the worker based upon a rate of compensation associated with the one or more completed tasks.

In another general respect, the embodiments disclose a method for tracking and calculating achievement-based compensation for a print service provider. The method includes receiving, by a processing device, a print job having various characteristics; creating, by the processing device, a job ticket by determining one or more tasks to be completed based upon the various characteristics, the one or more tasks including printing services to be completed, and assigning a unique identifier to each of the one or more tasks to be completed; receiving, by the processing device, information indicating the worker is performing at least one of the one or more tasks, the information indicating the worker is performing at least one of the one or more tasks comprises the unique identifier assigned to the at least one task being performed; updating, by the processing device, the job ticket to indicate the at least one task is being performed; receiving, by the processing device, information indicating at least one of the one or more tasks has been completed by a worker, the information indicating at least one or the one or more tasks has been completed comprises the unique identifier assigned to the at least one task completed; updating, by the processing device, the job ticket to indicate the at least one task is completed; and determining, by the processing device, a compensation level for the worker based upon a rate of compensation associated with the at least one completed tasks.

In another general respect, the embodiments disclose a system for tracking and calculating achievement-based compensation for a print service provider, the system including at least one workstation and a management computer system operably connected to the at least one workstation. The management computer system includes a computer readable medium and a processing device. The processing device is configured to determine one or more tasks associated with a print job to be completed, the one or more tasks including printing services to be completed, receive information indicating at least one of the one or more tasks has been completed by a worker, update a job ticket associated with the job to be completed to indicate that at least one of the one or more tasks has been completed, and determine a compensation level for the worker based upon a rate of compensation associated with the one or more completed tasks.

BRIEF DESCRIPTION OF THE DRAWINGS

FIG. 2 illustrates an exemplary screenshot of an interface for entering job related information according to an embodiment.

FIG. 3 illustrates an exemplary screenshot of a job ticket according to an embodiment.

DETAILED DESCRIPTION

For purposes of the discussion below, a "print job" refers to a specific print service that is to be completed. For example, a print job may include producing a magazine, producing a pamphlet, producing a poster, or any other print service offered by a print shop or other print service provider. A print job includes one or more "tasks" that are completed before the job is ultimately finished. For example, a task may include printing a page of a document, binding a series of pages, laminating a page, or any other individual step that may be required to produce a print job.

A "print shop" refers to a printing service provider or publisher capable of performing one or more print jobs. An exemplary print shop is described in reference to FIG. 5.

A "processing device" or a "processor" refers to a computer or other machine that performs one or more operations according to one or more programming instructions. An exemplary processing device or processor is described in reference to FIG. 7.

A "job ticket" refers to a physical or electronic document related to a print job. The job ticket lists the one or more tasks associated with the print job as well as any other related data such as where the tasks are to be completed or who is assigned to complete each task. An exemplary job ticket is described in reference to FIG. 3.

A "rate of compensation" refers to a monetary amount a worker is given for completing one or more tasks. For example, a work may have a rate of compensation equal to one dollar for each tasks completed.

A "rate of performance" refers to a qualitative review of a worker's performance. For example, a rate of performance may be calculated based upon time it takes a worker to complete a task as well as a "quality level" for the task. Quality level refers to the quality of a product produced during a specific task. For example, a quality level may refer to a print quality for a set of print documents, including but not limited to, spacing of the document, clarity and crispness of printed text and graphics, and condition of the printed media after the task is completed, e.g., is the paper folded, creased or otherwise damaged. A quality level is a numeric measurement such as a percentage (e.g., 95%) or a grade (such as a letter grade) associated with a numeric measurement (e.g., "A" equals 98%, "B" equals 90%, "C" equals 85%).

Figure 1:
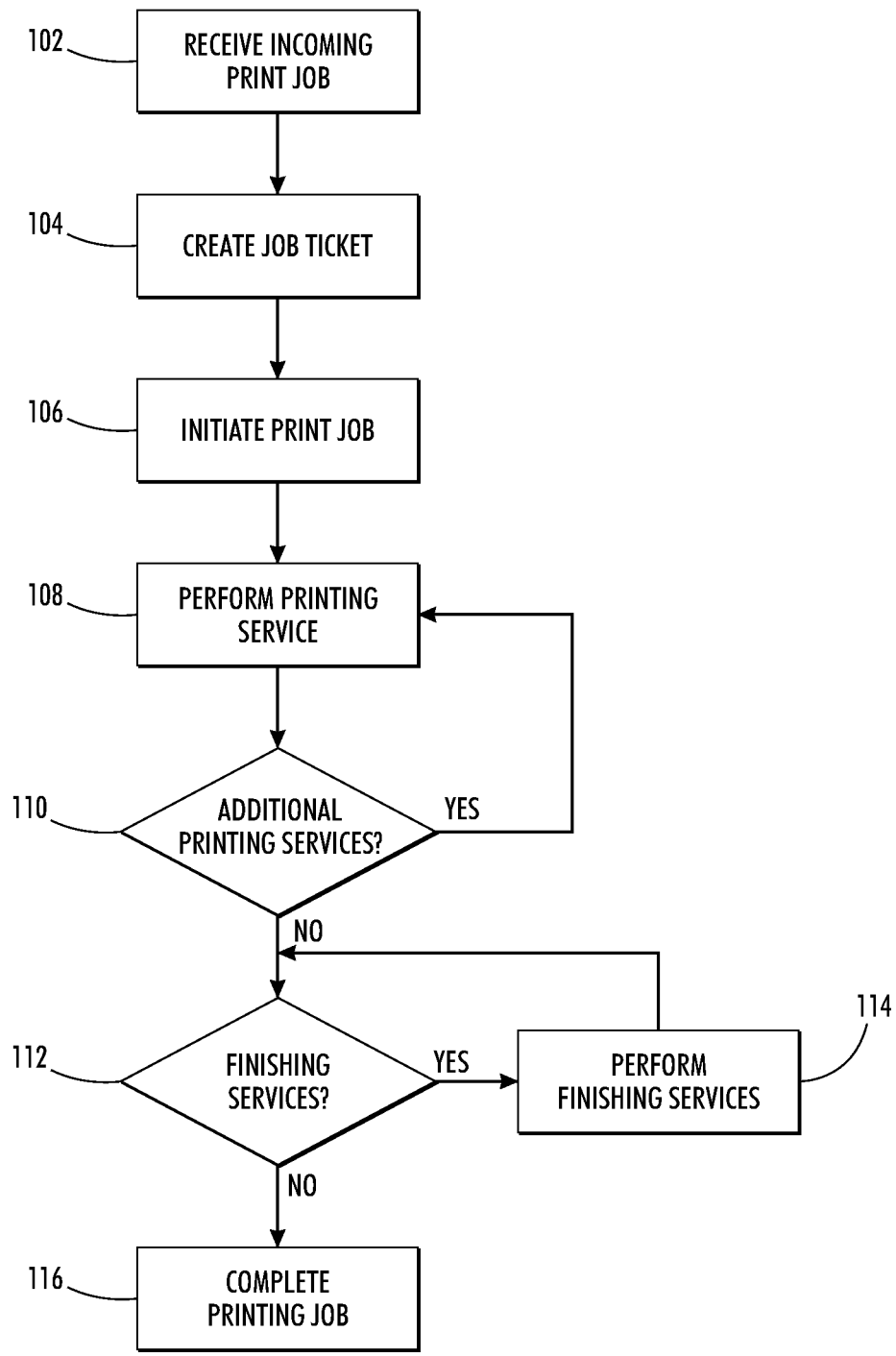
FIG. 1 illustrates an exemplary flow diagram for initiating and performing a job according to an embodiment.

FIG. 1 illustrates an exemplary process for initiating and performing a print job. The examples as described herein will outline the present invention as applied to print jobs having one or more associated tasks produced in a print service production environment. For example, the present invention may be applied to a magazine publishing print job, the print job include the follow tasks: color duplex printing, collating, cutting, binding, labeling, and quality control. However, it should be noted that the present invention may be used for all jobs that require one or more tasks to be completed such as various manufacturing and assembly processes.

A print service provider, such as a print shop or a publishing company, receives 102 an incoming print job. A management computer system associated with the print shop or publishing company may receive 102 the incoming print job from a customer. The customer may enter the print job electronically on an interface such as a website associated with the print shop or publishing company. Information related to the print job may be formatted and sent via a data network such as the Internet to the management computer system. The information related to the print job may include contact information related to the customer, specifics related to the print job to be performed, deadline information, shipping information, billing information, and other related information.

Based upon the information, the management computer system may automatically create 104 a job ticket related to the customer requested print job. The job ticket may include information pertaining to the print job such as customer name and contact information, type of print job to be performed, deadline information for the print job, and other related information. Additionally, the job ticket may include one or more tokens associated with tasks to be performed before the print job can be completed. Details of the job ticket are discussed in greater detail in the description of FIG. 3 below.

Alternatively, the print job may be received 102 from a customer that calls and interacts with a customer service representative (CSR) or via the customer entering information related to the print job into an online submission system. If the customer enters the information online via a website associated with the print shop or publishing company, a CSR may receive the electronic information and further process. The CSR may take information related to the print job and create 104 the job ticket.

Figure 2:
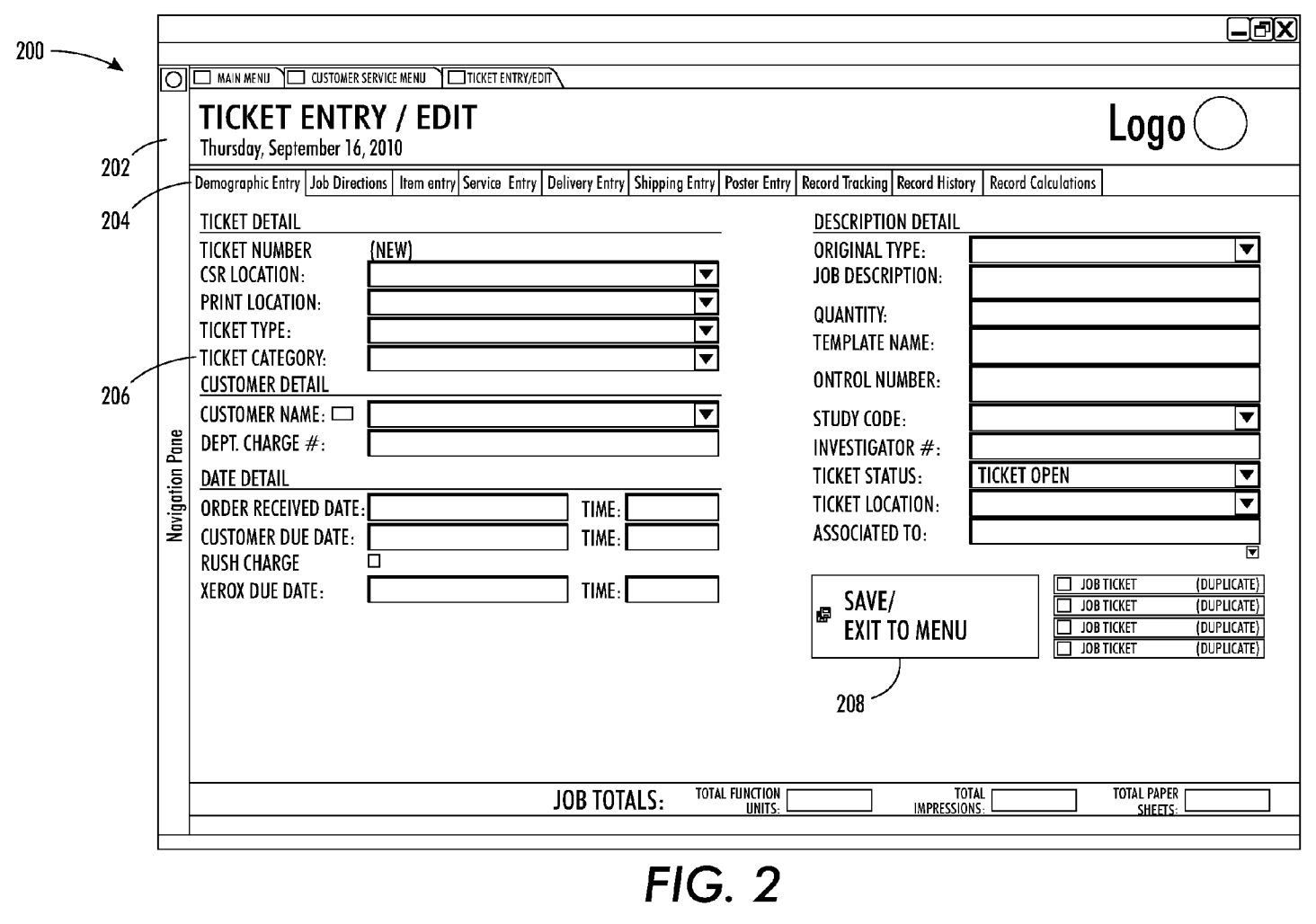

FIG. 2 illustrates an exemplary screenshot 200 of a user interface 202 that may be used by a customer to transmit information electronically to the management computer system or a CSR to create 104 a job ticket. The user interface 202 may include various tabs 204 related to specific information to be entered for a specific print job. For example, the tabs 204 may include, but are not limited to, demographic entry, job directions, item entry, service entry, delivery entry, shipping entry, poster entry, record tracking, record history, record calculations, and any other tabs that may be appropriate or related to a specific print job. Upon selecting a tab (i.e., Demographic Entry as shown in FIG. 2), an information entry form 206 may be displayed on the user interface 202. Through the entry form 206, the customer or the CSR may enter specific details related to the print job.

Based upon the information entered by either the customer or the CSR, a job ticket may be created 104 by the management computer system that includes one or more tasks to be completed before completion of the print job. For example, the customer or the CSR may select the tab 204 labeled "Job Description." Here, the customer or the CSR may enter each task to be performed for the print job. Alternatively, the customer or the CSR may select a print job to be completed (e.g., publish a magazine or print a poster), each job having an associated set of one or more tasks to be completed. For example, the CSR may enter the following tasks: duplex printing, color printing, collation, cover printing, assembly, binding, and quality control. Each separate task may include additional information. For example, duplex printing may include number of pages to be printed, which media to use for the printing, text font, text color, and other information related to the duplex printing. Binding may include type of binding to use and other related information. Alternatively, the customer or the CSR may select from a list of print job types or enter a custom print job type. A print job type may have an associated set of one or more tasks. The customer or CSR may accept the set of tasks, or may edit the set of tasks to include or remove one or more of the associated tasks. For example, the customer may select print a pamphlet. The associated tasks may include duplex printing, cutting and folding. The customer may desire to lower the cost by removing the folding task, thereby reducing the total number of associated tasks for the print job to 2 (i.e., duplex printing and cutting).

Similar information may be entered for the other tabs 204 such as shipping destination and shipping speed. Based upon the detailed information selected, a total price may be determined for the print job and communicated to the customer.

Once the detailed information is entered for a specific print job, the customer or the CSR may select a button or other input 208 to save the print job information and exit the user interface 202.

Alternatively, the information related to a print job may be automatically created 104 by the management computer system based upon information entered by or received 102 from the customer. For example, the management computer system may determine what type of print job the customer is requesting, and access a listing of tasks associated with that specific type or print job from a database, library, or other data structure. The management computing system may automatically create a job ticket based upon the information stored in the data structure including the individual tasks for the print job.

FIG. 3 illustrates an exemplary screenshot of a job ticket 300. The job ticket 300 may be created and stored on a specific management computer system (e.g., management system 506 as shown in FIG. 5) and accessed by a worker at a workstation located on the production line (e.g., workstation 504a as shown in FIG. 5). The job ticket 300 may include a set of one or more associated tasks related to a particular print job as determined and assigned by the management computer system. After each task is assigned by the management computer system to a print job, a unique identifier such as a token 302 may be assigned to each task. Each token 302 may be unique in that it identifies an individual task of a print job. Additionally, the job ticket 300 may include a set of identifiers 304 related to various areas or stations of the print shop or production line. The set of identifiers 304 may be a universal set of identifiers included for each job ticket created for a single print shop or print service provider. The combination of the token 302 and the set of identifiers 304 may be used by a worker on the production to identify where each task is being performed. This process is explained in greater detail in the discussion of FIG. 4 below.

It should be noted that the unique identifier or token is shown herein in the figures as a barcode by way of example only. Additional tokens may be used such as a personal identification number, an RFID tag, a QR code, or other similar identification tokens.

A job ticket may be printed out and associated with a set of supplies (e.g., paper, card stock, binding materials) that may be used for a specific print job. The job ticket may then be passed along to various devices with some or all of the supplies throughout the production of the print job. Alternatively, an electronic version of the job ticket may be displayed to each worker associated with a task to be performed for the print job.

Referring again to FIG. 1, after the job ticket is created 104, the print job may be initiated 106 at the print shop or on the production line. It should be noted that the print job may be initiated immediately after the job ticket is created 104 or, depending upon the due date of the print job, the initiation may be delayed for a certain period of time.

During production of the print job, a print service requested by the customer for the print job may be performed 108. For example, a series of pages may be duplex printed. Alternatively, a series of printed pages may be collated. If there are additional print services to be performed 110 such as color printing, the additional services are performed 108. For example, a series of pages may have been previously printed with black text, leaving an empty space for the inclusion of a color graphic. The color graphic may be printed on the series of pages as an additional print service at a separate location from the black text printing.

If there are no additional print services to be performed 110, a worker or processor may determine 112 if there are any finishing services for the print job. For example, if the customer requested binding, finishing services such as cutting, aligning and binding may be performed 114. After the finishing services are complete, or if there are no finishing services, the print job may be completed 116, delivered and billed to the customer accordingly.

It should be noted that at any time during the processing of a print job the process may be halted due to an error or other problem. The job ticket associated with a halted job may not be forwarded to the next worker assigned a task until the problem is corrected. Once the problem is corrected, the print job may resume. Similarly, if a print job has an extended deadline, the print job may be halted to allow for higher priority print jobs to be performed. Various information such as deadline for delivery and priority ratings may be included by the management computer system on the job ticket as well.

Figure 4:
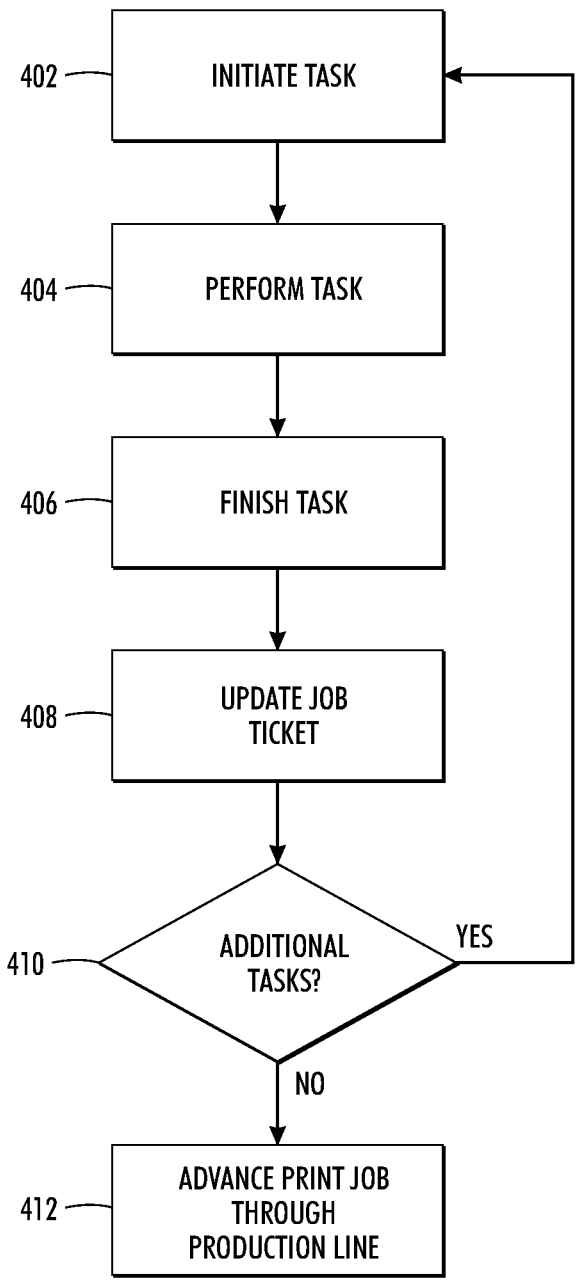
FIG. 4 illustrates an exemplary flow diagram for performing an individual task of a job according to an embodiment.
Figure 5:
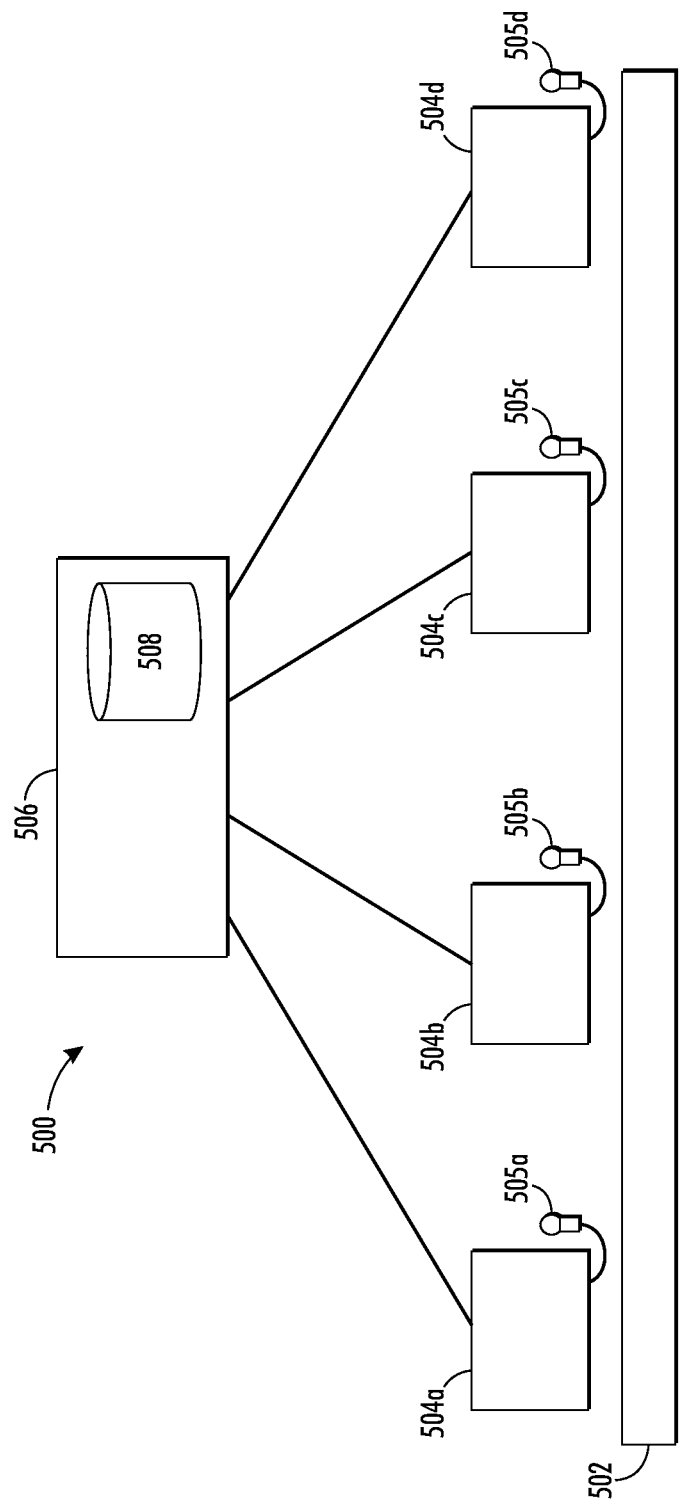
FIG. 5 illustrates various embodiments of an assembly line or production area for completing a job according to an embodiment.

FIG. 4 illustrates an exemplary process for performing an individual task by a worker. A worker may receive the job ticket (e.g., job ticket 300 as shown in FIG. 3), or a copy of the job ticket, indicating the worker is assigned to a task for that particular print job along with any supplies related to the print job such as paper, binding materials, and other related supplies. For a task the worker is assigned to, the worker may initiate 402 and perform 404 the task. Similarly, a job ticket may be displayed via an electronic display at a workstation or area of the production line being used by the worker. The electronic job ticket may include an identifier related to a bin or other storage container associated with the print job and including the related supplies.

For example, to perform 404 a specific task, each worker may first enter a personal identification number. This may include scanning a token, such as a barcode, QR code, RFID tag, or other similar token, on the worker's nametag or entering a personal identification number into a workstation via a barcode scanner, QR code scanner, RF tag receiver, or other similar input device operably connected to the workstation. By scanning their personal identification number, the worker sends an electronic message via the worker's workstation to the management computer system that the worker is about to initiate a task. The worker may then scan an appropriate task token to initiate 402 the task. By scanning the appropriate task token, the worker sends an electronic message via the workstation to the management computer system indicating the unique token being scanned. Based upon this information, the management computer system may determine what print job is being worked on, what specific task associated with the print job is being initiated, at what time the task is being initiated, and any other information the management computer system may be configured to determine.

After scanning the appropriate task token, the worker may then scan the appropriate job location token from, for example, the set of identifiers 304 included in job ticket 300 as shown in FIG. 3. By scanning the appropriate job location token, the worker sends an electronic message via the workstation to the management computer system indicating where in the print shop or print service production line the worker is performing the task. Once the worker scans the appropriate tokens, the management computing system may update the job ticket to indicate which worker is currently performing which task and where the task is being performed.

For example, at 1:15 P.M., a worker named Tom Johnson may scan his personal identification number token on his nametag, scan the token 302 for the label application task, and scan the shipping location token from the set of identifiers 304. This information may be transmitted from Tom's workstation to the management computer system. The management computer system may update the job ticket to indicate that Tom Johnson is performing label application for a specific print job beginning at 1:15 at the shipping location. After completing the task, the worker may scan his personal identification number, the token 302 for the specific task, and a token from the set of identifiers 304 indicating the task is complete. Based upon the worker scanning the task complete token, indicating the worker has finished 406 the task, the management computer system may update 408 the job ticket accordingly.

To continue the above example, at 1:31 P.M., Tom Johnson may scan his personal identification number token, scan the token 302 for the label application task, and select the task complete token from the set of identifiers 304. This information may be transmitted from Tom's workstation to the management computer system. The management computer system may update the job ticket to indicate that the label application task for a specific print job has been completed at 1:31.

The worker may then determine 410 by examining the updated job ticket if there are any additional tasks the worker can perform 404 for the print job. If there are, the worker initiates 402, performs 404 and finishes 406 the task as before. If the worker determines 410 there are no additional tasks, the print job may be advanced 412 through the production line.

FIG. 5 illustrates an exemplary production assembly or print shop 500. The print shop 500 may include a production line 502 by which a print job travels as tasks are completed. It should be noted the production line 502 is shown as a linear assembly line only by way of example. Various tasks associated with a print job (or other such production job) may be completed in disparate workstations located independently from one other in an assembly space or in different assembly spaces. For example, a job may include adding digital photographs and formatting text that may take place in a design office located remotely from the production line 502.

At various places along the production line 502 may be one or more workstations. As shown in FIG. 5, four workstations 504a, 504b, 504c and 504d are spaced along the production line 502. Each workstation 504a, 504b, 504c and 504d may be operated by a different worker and configured to perform one or more distinct tasks. For example, the workstation 504a may be configured to perform various printing tasks, the workstation 504b may be configured to perform collating and punching tasks, the workstation 504c may be configured to perform binding tasks, and the workstation 504d may be configured to perform shipping related tasks such as label creation, package assembly and sealing.

Each workstation 504a, 504b, 504c and 504d may have a corresponding input device such as a barcode scanner 505a, 505b, 505c and 505d. It should be noted that barcode scanners 505a, 505b, 505c and 505d are shown by way of example only and other input devices may be used accordingly. Each workstation 504a, 504b, 504c and 504d may be operably connected to a management computer system 506 located in the print shop 500 (as shown in FIG. 5) via local area network. Conversely, the management computer system 506 may be located at a remote location and operably connected to the workstations 504a, 504b, 504c and 504d via an external data network such as the Internet.

The management computer system 506 may include a database 508 for storing various information related to the operation of the system. For example, the database 508 may store the program instructions for displaying and receiving information from the CSR during the creation of a job ticket. The database 508 may also store the individual job tickets. The database 508 may also store information related to individual workers such as hourly rates for various tasks and tasks performed by that worker. For example, each time a worker completes a task, the management computer system 506 may update the database 508 to include the task as being completed by the worker. This information may be used to compensate the worker based upon the number and types of tasks the worker performs, thereby resulting in an achievement-based compensation (ABC) system where each worker is compensated based upon their individual performances.

Figure 6:
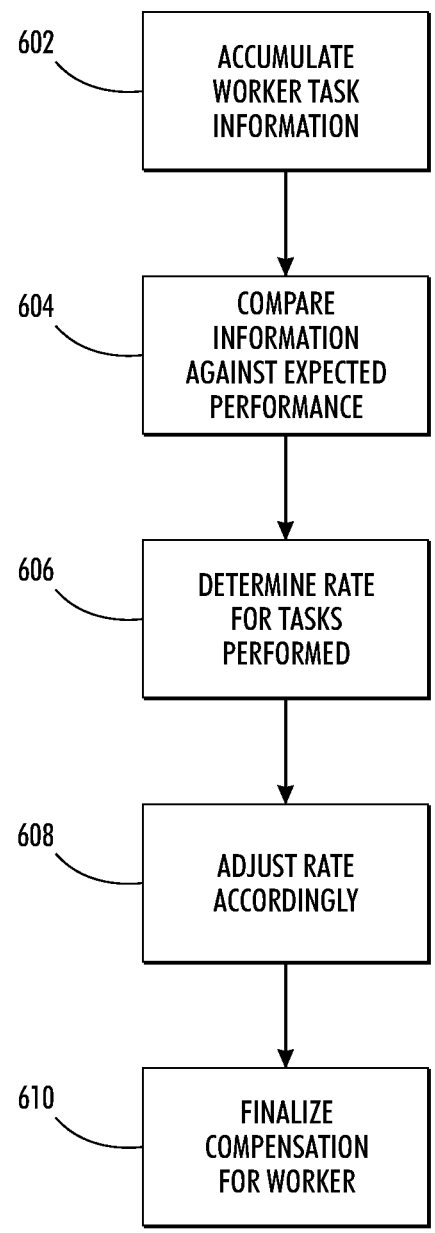
FIG. 6 illustrates an exemplary flow diagram for determining worker compensation according to an embodiment.

FIG. 6 illustrates an exemplary process or set of instructions for operation by the management computer system 506 (or another similar computer system) for determining compensation for each employee based upon the performance of the employee rather than the overall performance of the print shop 500. In prior art ABC models, employees were compensated based upon overall performance levels of all workers. The process as shown in FIG. 6, used in concert with the processes and systems discussed above in FIGS. 1-5, may result in a more efficient compensation system.

The management computer system may accumulate 602 various information related to worker task performance based upon information received from workers' workstations related to the tasks the workers are performing. Additionally, the management computer system may receive information from specialized workers related to the performance and quality levels of specific employees. For example, a quality control worker may examiner every tenth set of printed pages for a job. The quality control worker may scan their personal information number, the task token for the task they are reviewing, (e.g., the task token associated with printing), and the location for quality control. Based upon their review, the quality control worker may enter a quality level and reasoning for the quality level (e.g., printing misaligned) for the selected task at their workstation and transmit the quality level to the management computer system for storage and further analysis.

For example, the management computer system may accumulate 602 information related to: tasks completed, time to complete each task, expected time to complete each task, quality rating for a specific task, reasons for a specific quality rating, tasks that were redone due to error or low quality, tasks delayed by unforeseen circumstances, and/or other related information.

The information accumulated may be partially or wholly compared 604 against expected performance standards for a particular worker. For example, a worker may be expected to accomplish a set number of tasks at a specific quality level per hour. Based upon this comparison, the management computer system may calculate 606 a rate for each task based upon the worker's accumulated information. For example, a worker may be expected to perform ten printing tasks an hour at 98% quality. If the worker meets or exceeds the expectations, the worker receives at least full compensation. However, if the worker fails to meet expectations, the worker may receive less than full compensation.

Based upon the calculated 606 rate, the rate for an individual worker may be adjusted 608 accordingly. For example, if a worker produces less than 98% quality but above 95% quality expectations, the worker may receive a −5% rate adjustment 608. The scale may continue to decrease accordingly as quality level decreases until the worker receives no compensation or other penalties such as suspensions or termination.

This process may be performed for each task or set of tasks the worker has performed. Based upon the total adjusted rate information, a total compensation for the worker may be calculated and finalized 610.

A worker may be similarly compensated above the standard rate if the worker accomplishes tasks at a higher-than-expected level. However, the worker may have to achieve a similar quality level. For example, a worker may complete 115% of an expected amount of tasks for a given time period. Based upon the quality level of the worker's tasks, the worker may receive a +5% rate adjustment. For example, the penalties associated with quality as used above may apply in this case as well. If the worker produces between 98% and 95% quality, the associated −5% rate adjustment may cancel out the positive rate adjustment associated with the exceeded production levels.

To continue the above example, Tom Johnson may be expected to perform 100 bindings per 8 hour shift with a 98% quality level. For a given shift, Tom Johnson performed 103 bindings at a 95% quality level. Based upon the lower quality level, Tom Johnson's compensation for that shift may be 5% less than standard compensation.

It should be noted the rate adjustment 608 as discussed above may be modified. For example, a worker may be graded for each task. A worker may be assigned a numerical or letter grade for each task based upon, for example and without limitation, time to complete the task and quality of the task. The grades accumulated for a worker through a time period (e.g., every two weeks) may be averaged together to determine an overall adjustment rate for the worker. The worker's compensation may be finalized 610 based upon this overall adjustment rate.

Alternatively, a worker's compensation may be calculated on a task-by-task basis as opposed to comparing cumulative information against expected performance. In this compensation model, a worker may be motivated to perform additional tasks as each task has an individually associated incentive. As before, the management computer system may accumulate 602 data related to each task a worker performs. However, rather than compare 604 the accumulated information for a collection of tasks against expected performance information, the management computer system may compare each individual task information against associated standard task information such as expected time to complete, rate of pay per task completed, expected quality level, and other similar task related information. Based upon this comparison 604, the management computer system may determine 606 a rate for each task performed by a worker rather than a collective rate for a set of tasks. For example, a binding task may have an associated rate of $0.50 per binding, a labeling task may have an associated value of $0.05 per label applied, etc. Based upon the determined 606 rates, the management computer system may adjust 608 the rates accordingly based upon quality level.

For example, a binding may be worth $0.50 for 98% quality, $0.45 for 95%-98%, $0.40 for 90%-95%, and nothing for less than 90% quality. A worker may have completed 5 bindings in a shift, two of which were at 100% quality, 2 of which were at 97% quality, and 1 that was at 92% quality. Thus, the workers adjusted 608 rate for the 5 bindings is $2.30 ($0.50+$0.50+$0.45+$0.45+$0.40).

This may be repeated for each task the worker has performed. Based upon the total adjusted 608 rates for each task the worker has performed, a total compensation may be finalized 610 for the worker.

It should be noted that the above compensation models do not limit a worker to performing only a single type of task. A worker may switch from one type of task to another quickly and efficiently through use of the task identification tokens. By scanning a token to initiate a specific task, a worker may be accurately compensated for each specific task the worker performs as opposed to receiving a set rate of compensation for each shift (or hour) worked. For example, a worker may receive a higher compensation rate for each binding the worker does as compared to the compensation rate the worker receives for a color printing task. Based upon the tracking of each individual task (and accompanying performance rates and quality levels), a worker may be accurately and efficiently compensated for each task the worker performs.

Figure 7:
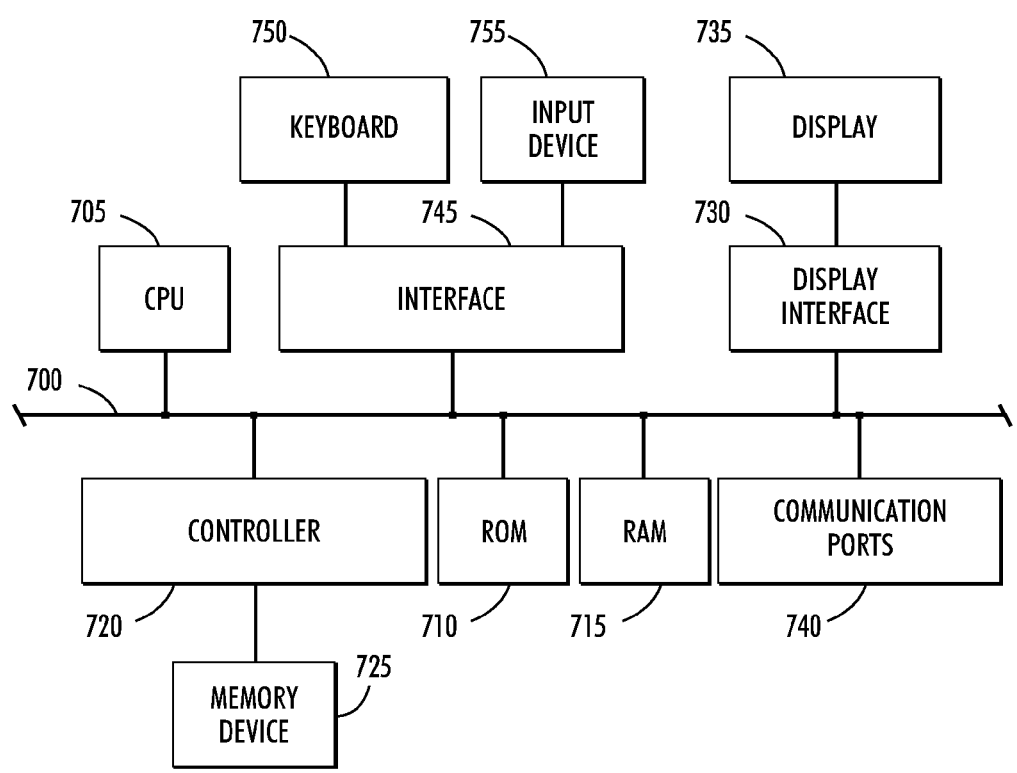
FIG. 7 illustrates various embodiments of a computing device for implementing various methods and processes described herein.

FIG. 7 depicts a block diagram of exemplary internal hardware that may be used to contain or implement the various computer systems as discussed above such as the various workstations 504a, 504b, 504c and 504d and management system 506. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an exemplary processing device, computing device or processor as such terms are used within this disclosure. Read only memory (ROM) 710 and random access memory (RAM) 715 constitute exemplary memory devices.

A controller 720 interfaces with one or more optional memory devices 725 to the system bus 700. These memory devices 725 may include, for example, an external or internal DVD drive, a CD ROM drive, a hard drive, flash memory, a USB drive or the like. As indicated previously, these various drives and controllers are optional devices. Additionally, the memory devices 725 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any the identification process associated with the ABC methods and systems as discussed above may be stored in the ROM 710 and/or the RAM 715. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 730 may permit information from the bus 700 to be displayed on the display 735 in audio, visual, graphic or alphanumeric format. The information may include information related to a current job ticket and associated tasks. Communication with external devices may occur using various communication ports 740. An exemplary communication port 740 may be attached to a communications network, such as the Internet or an local area network.

The hardware may also include an interface 745 which allows for receipt of data from input devices such as a keyboard 750 or other input device 755 such as the barcode scanners 505*a*, 505*b*, 505*c* and 505*d*, mouse, a joystick, a touch screen, a remote control, a pointing device, a video input device and/or an audio input device.

The systems and processes described above provides for numerous embodiments. For example, the system as described above may be expanded to provide a robust customer interface. The customer may be able to access the management computer system via an external network such as the Internet to access information related to a specific print job. For example, the customer may be able to see what tasks have been completed and what tasks still need to be completed for a specific print job. Similarly, the management computer system may be configured to provide a customer with automatic notices depending upon the progress of a print job. For example, upon the completion of each task, the management computer system may send an electronic message to the client indicating the task has been completed.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method for tracking and calculating achievement-based compensation for one or more workers at a print service provider, the method comprising:
   determining, by a processing device, a plurality of tasks associated with a print job to be completed, the plurality of tasks including printing services to be completed such that each of the plurality of tasks defines a specific print service to be completed in order to process the print job, each task comprising an associated rate of compensation to be paid to a worker that completes the task;
   assigning, by the processing device, a unique identifier to each task in the plurality of tasks;
   creating, by the processing device, a job ticket for the job including the unique identifiers for the plurality of tasks to be completed;
   receiving, by the processing device, information indicating that the worker is performing at least one of the plurality of tasks, wherein the information comprises the unique identifier assigned to the at least one task;
   receiving, by the processing device, information indicating at least one of the plurality of tasks has been completed by a worker;
   updating, by the processing device, the job ticket associated with the job to be completed to indicate that at least one of the plurality of tasks has been completed by the worker;
   determining, by the processing device, a compensation level for the worker for each task the worker completed based upon the rate of compensation associated with each completed task; and
   determining, by the processing device, a total compensation for the worker based upon the compensation level for the worker for each task the worker completed.

2. The method of claim 1, wherein the information indicating the worker is performing at least one of the plurality of tasks further comprises:
   a second identifier indicating the worker; and
   a third identifier indicating a location where the task is being performed.

3. The method of claim 1, wherein the unique identifier comprises a barcode.

4. The method of claim 1, wherein determining the compensation level for the worker for each task the that the worker completed comprises:
   determining an expected rate of performance for the worker;
   comparing the expected rate of performance against an actual rate of performance for the worker; and
   adjusting the compensation level for one or more of the tasks that the worker completed based upon the comparing.

5. The method of claim 1, wherein determining the compensation level for the worker for each task the that the worker completed comprises:
   determining a quality level for the worker; and
   adjusting the compensation level for one or more of the tasks that the worker completed based upon the quality level for the worker.

6. A method for tracking and calculating achievement-based compensation for one or more workers at a print service provider, the method comprising:
   receiving, by a processing device, a print job having various characteristics;
   creating, by the processing device, a job ticket by determining a plurality of tasks to be completed based upon the various characteristics, the plurality of tasks including printing services to be completed such that each of the plurality of tasks defines a specific print service to be completed in order to process the print job, each task comprising an associated rate of compensation to be paid to a worker that completes the task, and assigning a unique identifier to each task in the plurality of tasks to be completed;
   receiving, by the processing device, information indicating the worker is performing at least one of the plurality of tasks, the information indicating the worker is performing at least one of the plurality of tasks comprises the unique identifier assigned to the at least one task being performed;
   updating, by the processing device, the job ticket to indicate the at least one task is being performed by the worker;
   receiving, by the processing device, information indicating at least one of the plurality of tasks has been completed by a worker, the information indicating at least one or the plurality of tasks has been completed comprises the unique identifier assigned to the at least one task completed;
   updating, by the processing device, the job ticket to indicate the at least one task has been completed by the worker;
   determining, by the processing device, a compensation level for the worker for each task the worker completed based upon the rate of compensation associated with each completed task; and
   determining, by the processing device, a total compensation for the worker based upon the compensation level for the worker for each task the worker completed.

7. The method of claim 6, wherein the information indicating the worker is performing at least one of the plurality of tasks further comprises:
   a second identifier indicating the worker; and
   a third identifier indicating a location where the task is being performed.

8. The method of claim 6, wherein the determining compensation for the worker comprises:
   determining an expected rate of performance for the worker;

comparing the expected rate of performance against an actual rate of performance for the worker; and adjusting the compensation level for one or more of the tasks that the worker completed based upon the comparing.

9. The method of claim 6, wherein the determining compensation for the worker comprises:

determining a quality level for the worker; and adjusting the compensation level for one or more of the tasks that the worker completed based upon the quality level for the worker.

10. The method of claim 6, wherein the unique identifier comprises a barcode.

11. A system for tracking and calculating achievement-based compensation for one or more workers at a print service provider, the system comprising:

at least one workstation; and a management computer system operably connected to the at least one workstation and comprising:

a computer readable medium, and a processing device operably configured to:

determine a plurality of tasks associated with a print job to be completed, the plurality of tasks including printing services to be completed such that each of the plurality of tasks defines a specific print service to be completed in order to process the print job, each task comprising an associated rate of compensation to be paid to a worker that completes the task, assign a unique identifier to each task in the plurality of tasks, create a job ticket for the job including the unique identifiers for the plurality of tasks to be completed, receive information indicating that the worker is performing at least one of the plurality of tasks, wherein the information comprises the unique identifier assigned to the at least one task, receive information indicating at least one of the plurality of tasks has been completed by a worker, update the job ticket associated with the job to be completed to indicate that at least one of the plurality of tasks has been completed by the worker, determine a compensation level for the worker for each task the worker completed based upon a rate of compensation associated with each completed task, and determine a total compensation for the worker based upon the compensation level for the worker for each task the worker completed.

12. The system of claim 11, wherein the information indicating that the worker is performing at least one of the plurality of tasks further comprises:

a second identifier indicating the worker; and a third identifier indicating a location where the task is being performed.

13. The system of claim 11, wherein the unique identifier comprises a barcode.

14. The system of claim 11, wherein the processing device is further configured to:

determine an expected rate of performance for the worker;

compare the expected rate of performance against an actual rate of performance for the worker; and adjust the compensation level for one or more of the tasks that the worker completed based upon the comparing.

15. The system of claim 11, wherein the processing device is further configured to:

determine a quality level for the worker; and adjust the compensation level for one or more of the tasks that the worker completed based upon the quality level for the worker.

\* \* \* \* \*